July 23, 1968   F. I. FULLER   3,394,382
STYLUS DRIVE APPARATUS
Filed Oct. 31, 1966
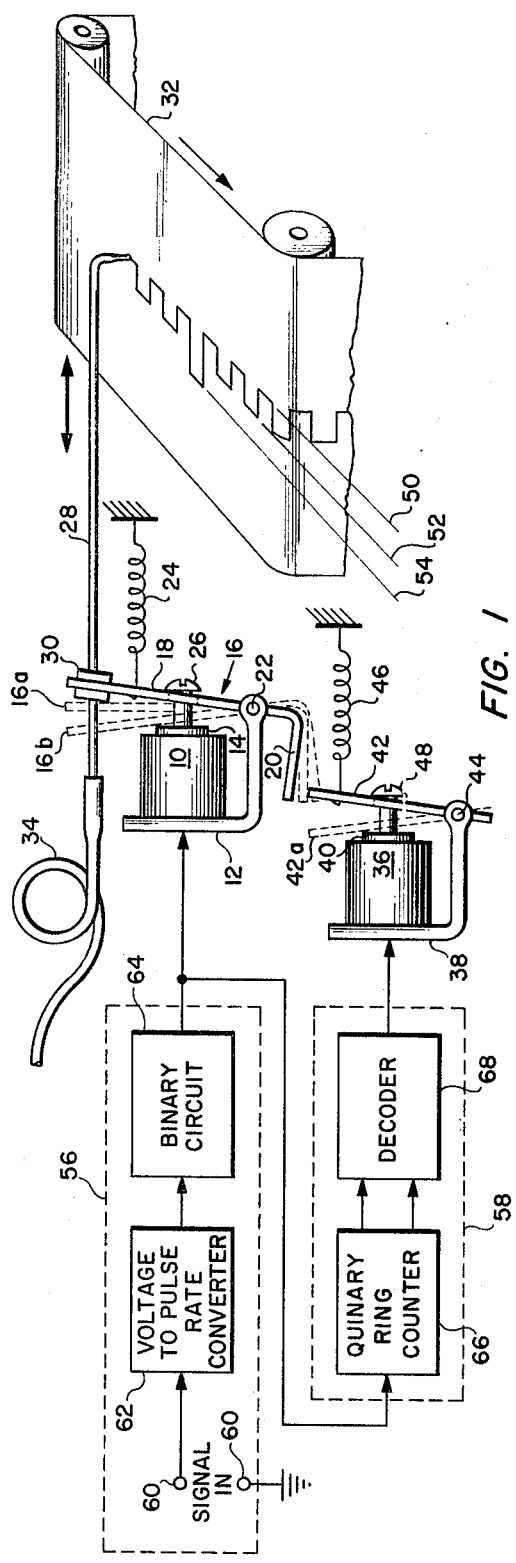
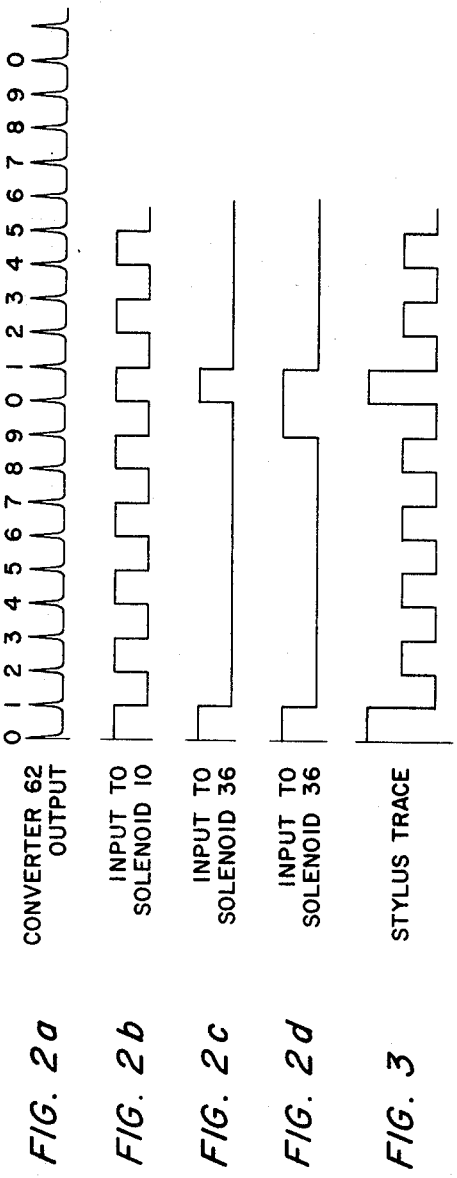
FRANK I. FULLER
INVENTOR.
BY *Louis Mok*
ATTORNEY

United States Patent Office
3,394,382
Patented July 23, 1968

3,394,382
STYLUS DRIVE APPARATUS
Frank I. Fuller, Menlo Park, Calif., assignor to Beckman Instruments, Inc., a corporation of California
Filed Oct. 31, 1966, Ser. No. 590,869
2 Claims. (Cl. 346—23)

ABSTRACT OF THE DISCLOSURE

A stylus drive apparatus in which the stylus is driven by a first solenoid device. A second solenoid device actuates a stop lever which is in a position to intercept and limit the travel of the stylus support when the first solenoid is energized. When the second solenoid is energized the stop lever is moved out of the path of the stylus support and the first solenoid is thereby permitted full travel. The stylus can thereby produce traces on two levels. A first circuit periodically energizes the first solenoid and a second circuit energizes the second solenoid at a frequency which is a predetermined submultiple of the frequency of energization of the first solenoid. Thus the stylus produces a trace in which a pulse of greater amplitude is periodically produced thereby permitting the pulses to be readily counted.

This invention relates generally to recording devices employing a movable strip chart and particularly to a novel apparatus for actuating a recording stylus relative to the chart.

It is an object of the present invention to provide an apparatus for periodically displacing a recording stylus relative to the strip chart in response to an input signal representing a quantity to be measured. A stylus driven by the apparatus of the present invention produces a train of pulses which may be conveniently counted. The apparatus is compact, has a minimum of moving parts, and is subject to substantially no wear. Further, it requires little or no maintenance and is easy to adjust.

In carrying out the present invention in one exemplary form, there are provided two electromechanical devices each having an energized state and a de-energized state. The first device drives a stylus support means and the second one actuates a stop means. With the second device de-energized, the stop means is in a position to intercept and limit the travel of the stylus support means when the first device is energized. With the second electromechanical device energized, the stop means is moved out of the path of the support means when the first electromechanical device is energized thereby permitting full travel of the support means. First and second circuit means are provided for periodically energizing the first and second electromechanical devices, respectively. The second circuit means energizes the second electromechanical device at a frequency which is a predetermined submultiple of the frequency of energization of the first electromechanical device. In this way, the stylus produces a trace in which a pulse of greater amplitude is periodically produced thereby permitting the pulses to be readily counted.

The novel features which are believed to be characteristic of the invention are set forth with particularity in the appended claims. The invention itself, however, together with further objects and advantages thereof, can best be understood by reference to the following description taken in connection with the accompanying drawings in which:

FIG. 1 is a schametic diagram of a stylus drive apparatus according to the present invention;

FIGS. 2a, 2b, 2c are diagrammatic presentations of wave forms existing at selected points in the electrical circuit portion of the apparatus of FIG. 1; and FIG. 3 is a diagrammatic presentation of a typical trace produced by a stylus actuated by an apparatus in accordance with the present invention.

Referring now to the drawings, the numeral 10 designates a first electromechanical device which may be in the form of a solenoid unit. The unit 10 is mounted on a bracket 12 and includes a pole piece or core 14 and an armature 16. The armature 16, which functions as a stylus support, is in the form of a crank having arms 18 and 20 and is pivoted about a pin 22 mounted on the bracket 12. A tension spring 24, attached between a fixed point and the arm 18, biases the armature 16 away from the core 14 and against the head of an adjustable screw 26 secured to the core 14 and passing through an opening in the arm 18. It will be seen that adjustment of the screw 26 controls the travel of the armature 16 away from the core 14.

A recording stylus 28 is attached to the upper end of the arm 18 by means of a flexible coupling 30. The tip of the stylus 28 is maintained in contact with a movable strip chart 32 by a suitable biasing means (not shown). In the embodiment of FIG. 1, an ink recording stylus is depicted and a length of flexible tubing 34 is shown connected thereto for feeding ink to the stylus. It is to be understood however, that the present invention is applicable to any of the variety of styluses known in the recording art including, for example, heat or thermo recording styluses and electrical recording styluses. It will also be obvious to those skilled in the recording art that a mirror may be substituted for the stylus 28 for use in an optical recording system.

The solenoid unit 10 is energized by application of a suitable electrcal signal to the solenoid coil as will be desscribed below. In the energized state, the armature 16 is attracted by and makes contact with the core 14. When the solenoid unit 10 is de-energized, the spring 24 returns the armature 16 to its initial position.

Located adjacent the solenoid unit 10 is a second electro-mechanical device 36 which may be structurally identical to the solenoid unit 10. The unit 36 is mounted on a bracket 38 and includes a core 40 and a lever-type armature 42 mounted for pivotal movement about a pin 44 carried by the bracket 38. The armature 42 is biased by a tension spring 46 away from the solenoid 36 and against the head of an adjustable screw 48 carried by the core 40.

It will be seen that with the solenoid unit 36 in the de-energized state, energization of the solenoid unit 10 causes the armature 16 to pivot in a counter-clockwise direction until the lateral arm 20 strikes the upper edge of the armature 42. The armature 42 thus serves as a stop means to effectively limit the travel of the armature 16 (as shown by the dotted line 16a) and hence the stylus 28. With both solenoid units 10 and 36 energized, the armature 42 is moved toward its solenoid, that is, to the position shown by the dotted lines 42a and the armature 16 is permitted its full travel as shown by the dotted line 16b. It will be seen, therefore, that depending upon the states of the solenoid units 10 and 36, the stylus 28 will produce a trace on one of three levels—a base or reference level 50 when both units are de-energized; an intermediate level 52 when unit 10 is energized but the unit 36 remains de-energized (the armature 42 acting to limit the travel of the armature 16); and a maximum level 54 when both units 10 and 36 are in the energized state and the armature 16 is permitted its full travel.

A suitable electrical circuit for energizing the solenoid units 10 and 36 will now be described. Basically, the circuit comprises a first circuit means 56 for periodically energizing the solenoid unit 10 and a second circuit means 58 for periodically energizing the solenoid unit 36 at a subfrequency of energization of the solenoid unit 10. The first circuit means 56 may take the form of a suitable pulse source and the second circuit means 58 may be a dividing circuit which responds to the output of the pulse source to intermittently drive the solenoid unit 36. The various ways for implementing the foregoing will be apparent to those skilled in the art and the following description is merely a preferred arrangement which finds particular usefulness as an integrator.

An input signal, which may be a varying unidirectional voltage, is applied to a pair of terminals 60 of a voltage-to-pulse-rate converter 62. The converter 62 produces a pulse train like that shown in FIG. 2a, having a repetition rate functionally related to the magnitude of the input signal voltage. The pulsed output of the converter 62 is applied to a binary or "divide-by-two" circuit 64 having a square pulse output (FIG. 2b) which is applied directly to the first solenoid unit 10. The output of the binary 64 is also fed to the dividing circuit 58 for periodically energizing the solenoid unit 36. The dividing circuit may comprise simply a counter 66 which directly pulses the unit 36 in response to a predetermined number of input pulses from the binary circuit 64.

Although a counter having any number of stages will suffice, counting of the pulses recorded by the stylus 28 is made most convenient by utilizing a quinary counter or the equivalent. Thus, for every five pulses appearing at the output of the binary 64 (which represent ten pulses produced by the converter 62), one pulse is applied to the input of the solenoid unit 36 (FIG. 2c) and every fifth pulse traced by the stylus 28 will be raised (FIG. 3). A quinary ring counter, suitable for purposes of the present invention, is disclosed in the copending application of R. J. Ehret, Ser. No. 562,179, filed on July 1, 1966, and assigned to the assignee of the present invention.

It is desirable to have the energization of the solenoid unit 36 lead the energization of the solenoid unit 10 so that the armature 42 will be well out of the way by the time the armature 16 is actuated. This may be accomplished in several ways. For example, a suitable delay circuit or delay line may be incorporated in the input to the solenoid unit 10. A preferred arrangement, however, is to utilize a gated ring counter, such as that disclosed in the aforementioned copending application, which produces an output signal distinctive from all other output signals during at least two states of the counter. A suitable decoder 68, connected to the appropriate stages of the counter, may be utilized to energize solenoid unit 36 when the distinctive counter output signal is present. In this way, the solenoid unit 36 may be energized in advance of the unit 10, for example, on every ninth pulse from the converter 62 and de-energized simultaneously with the solenoid unit 10, as shown in FIG. 2d.

It will be obvious to those skilled in the art that various modifications may be made to the specific exemplary embodiments of the invention described. For example, additional solenoid units may be utilized in conjunction with the existing units 10 and 36 to provide numerous intermediate limits upon the travel of the armature 16, and hence the stylus 28. In this way, pulses of many different heights may be traced.

While particular embodiments have been disclosed, it will be understood that the invention is not limited thereto and that it is contemplated to cover in the appended claims any such modifications as fall within the true spirit and scope of the invention.

What is claimed is:

1. In an apparatus for driving a recording stylus relative to a movable chart, the combination including
    a first electromechanical device, having an energized state and a de-energized state, connected to drive a stylus support means;
    a second electromechanical device, having an energized state and a de-energized state, connected to actuate a stop means positioned to intercept and limit the travel of said support means when said second electromechanical device is in the de-energized state, and to permit full travel of said support means when said second electromechanical device is in the energized state;
    first circuit means comprising a pulse source connected to said first electromechanical device for periodically energizing said first electromechanical device;
    second circuit means comprising a dividing circuit responsive to pulses from said first pulse source connected to said second electromechanical device for periodically energizing said second electromechanical device at a frequency which is a predetermined submultiple of the frequency of energization of said first electromechanical device;
    said pulse source including a voltage to pulse rate converter connected to drive a binary circuit having a pulse output coupled to said first electromechanical device; and
    said dividing circuit including a quinary counter responsive to said binary circuit output to cause said periodic energization of said second electromechanical device.

2. In an apparatus for driving a recording stylus relative to a strip chart, the combination including
    a support mounted for translation toward and away from a reference position, said stylus being carried by said support;
    a first solenoid unit proximate said support for magnetically translating said support away from said reference position upon energization of said first solenoid unit;
    means connected to said support for resiliently biasing said support toward said reference position;
    stop means positioned proximate said support, said stop means being movable between two positions, in one position intercepting said support to limit the travel of said support and in the other position permitting full travel a said support;
    a second solenoid unit having energized and de-energized states and positioned proximate said stop means for moving said stop means away from said support-intercepting position upon energization;
    means connected to said stop means for resiliently biasing said stop means toward said support-intercepting position;
    a first pulse source including a voltage to pulse rate converted connected to drive a binary circuit having an output coupled to said first solenoid unit;
    a second pulse source comprising a dividing circuit including a counter responsive to said binary circuit output, said counter being connected to energize said second solenoid unit; and
    a decoder connecting the counter output with said second solenoid unit input, said counter being a quinary ring counter, prdoucing in at least two states a stable output signal distinct from the stable output signal produced in all other states, so that for every five energizing pulses applied to said first solenoid unit, one energizing pulse is applied to said second solenoid unit and said second solenoid unit is energized in advance of said first unit and both are de-energized simultaneously.

References Cited

UNITED STATES PATENTS

| | | | |
|---|---|---|---|
| 1,253,305 | 1/1918 | Tulloss | 346—62 X |
| 2,496,392 | 2/1950 | Hasbrook | 346—23 |
| 3,192,532 | 6/1965 | Bruchschmidt | 346—23 |
| 3,287,640 | 11/1966 | Rehage | 324—113 |

RICHARD B. WILKINSON, Primary Examiner.

J. W. HARTARY, Assistant Examiner.